(12) United States Patent
Pham et al.

(10) Patent No.: US 11,294,106 B2
(45) Date of Patent: Apr. 5, 2022

(54) UNITARY OPTICAL FILM ASSEMBLY

(71) Applicant: 3M INNOVATIVE PROPERTIES COMPANY, St. Paul, MN (US)

(72) Inventors: Tri D. Pham, Woodbury, MN (US); Qingbing Wang, Woodbury, MN (US); Daniel J. Theis, Mahtomedi, MN (US); Encai Hao, Woodbury, MN (US); Keith R. Bruesewitz, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 711 days.

(21) Appl. No.: 16/076,004

(22) PCT Filed: Feb. 10, 2017

(86) PCT No.: PCT/US2017/017417
§ 371 (c)(1),
(2) Date: Aug. 7, 2018

(87) PCT Pub. No.: WO2017/139611
PCT Pub. Date: Aug. 17, 2017

(65) Prior Publication Data
US 2021/0191003 A1 Jun. 24, 2021

Related U.S. Application Data

(60) Provisional application No. 62/293,689, filed on Feb. 10, 2016.

(51) Int. Cl.
*G02B 5/02* (2006.01)
*B29D 11/00* (2006.01)

(52) U.S. Cl.
CPC ...... *G02B 5/0205* (2013.01); *B29D 11/00788* (2013.01); *G02B 5/0273* (2013.01)

(58) Field of Classification Search
CPC ................ G02B 5/0205; G02B 5/0273; B29D 11/00788
See application file for complete search history.

(56) References Cited

U.S. PATENT DOCUMENTS

| | | | |
|---|---|---|---|
| 5,396,350 A * | 3/1995 | Beeson ................ | G02B 6/0053 349/62 |
| 6,214,111 B1 | 4/2001 | Yapel et al. | |
| 6,576,296 B1 | 6/2003 | Yapel et al. | |
| 7,339,635 B2 | 3/2008 | Freking et al. | |
| 7,480,097 B2 | 1/2009 | Nagahama et al. | |
| 7,857,471 B2 | 12/2010 | Ohta et al. | |
| 8,289,639 B2 | 10/2012 | Whitney | |
| 8,917,447 B2 | 12/2014 | Wolk et al. | |
| 8,942,522 B2 | 1/2015 | Edmonds et al. | |

(Continued)

FOREIGN PATENT DOCUMENTS

| | | |
|---|---|---|
| JP | 2006337753 A | 12/2006 |
| JP | 2009-015220 A | 1/2009 |

(Continued)

*Primary Examiner* — Robert E. Tallman

(57) ABSTRACT

A unitary optical film stack comprising a light redirecting film assembly; a light diffusion film assembly; and an optical adhesive; wherein the light redirecting film assembly and the light diffusion film assembly are physically coupled non-continuously to minimize optical coupling.

19 Claims, 4 Drawing Sheets

(56) References Cited

U.S. PATENT DOCUMENTS

| | | |
|---|---|---|
| 8,947,799 B2 | 2/2015 | Edmonds et al. |
| 9,116,285 B2 | 8/2015 | Edmonds et al. |
| 9,243,774 B2 | 1/2016 | Kim et al. |
| 9,279,918 B2 | 3/2016 | Haag et al. |
| 2003/0223216 A1 | 12/2003 | Emmons et al. |
| 2007/0189038 A1* | 8/2007 | Pokorny ............ A47H 7/02 362/615 |
| 2008/0049330 A1 | 2/2008 | Tolbert et al. |
| 2010/0302479 A1 | 12/2010 | Aronson et al. |
| 2012/0038990 A1 | 2/2012 | Hao et al. |
| 2012/0113622 A1 | 5/2012 | Aronson et al. |
| 2012/0147593 A1 | 6/2012 | Yapel et al. |
| 2012/0287677 A1 | 11/2012 | Wheatley et al. |
| 2013/0004728 A1 | 1/2013 | Boyd et al. |
| 2013/0202867 A1 | 8/2013 | Cogglo et al. |
| 2013/0222911 A1 | 8/2013 | Cogglo et al. |
| 2013/0302594 A1 | 11/2013 | Sugiyama et al. |
| 2014/0168766 A1 | 6/2014 | Boyd |
| 2015/0043074 A1 | 2/2015 | Patel et al. |
| 2015/0140316 A1 | 5/2015 | Steiner et al. |
| 2015/0153021 A1 | 6/2015 | Edmonds et al. |
| 2015/0293272 A1 | 10/2015 | Pham et al. |
| 2016/0116664 A1 | 4/2016 | Wheatley et al. |
| 2016/0368019 A1 | 12/2016 | Wolk et al. |

FOREIGN PATENT DOCUMENTS

| | | |
|---|---|---|
| JP | 2009-294240 A | 12/2009 |
| JP | 2015150796 A | 8/2015 |
| KR | 10-2011-0089721 | 8/2011 |
| KR | 10-2011-0125483 A | 11/2011 |
| WO | WO 2010/075387 | 7/2010 |
| WO | WO 2011/056475 | 5/2011 |
| WO | WO 2011/130151 | 10/2011 |
| WO | WO 2011/130155 | 10/2011 |
| WO | WO 2013/148407 | 10/2013 |
| WO | WO 2015/072420 | 5/2015 |
| WO | WO 2017/024265 | 2/2017 |

\* cited by examiner

UNITARY OPTICAL FILM ASSEMBLY

CROSS REFERENCE TO RELATED APPLICATIONS

This application is a national stage filing under 35 U.S.C. 371 of PCT/US2017/017417, filed Feb. 10, 2017, which claims the benefit of U.S. Provisional Application No. 62/293,689, filed Feb. 10, 2016, the disclosure of which is incorporated by reference in its entirety herein.

FIELD

This invention relates to new constructions for unitary optical film stacks (i.e., bonded assemblies of optical films, in particular assemblies comprising a light redirecting film assembly and a light diffusion film assembly) with improved bond strength, cosmetic appearance, and uniformity of desired optical properties.

BACKGROUND

Optical displays, such as backlit liquid crystal displays ("LCDs"), are used in a wide variety of device applications including mobile telephones, personal digital assistants ("PDAs"), electronic games, laptop computers, monitors, and television screens. Typically a plurality of optical films are stacked within an optical display in order to enhance brightness and improve display performance without sacrificing battery life. Ideally, optical films are stacked in such a manner that an air gap is maintained between adjacent films to optimize optical performance.

Presently, films used in displays are often provided as individual films to display manufacturers. The films typically include tabs that are useful in orienting and positioning the films, and cover sheets to protect the surfaces of the films. During assembly of a display, the cover sheets are removed, and the films are stacked, one by one, for instance, into a frame that fits between a backlight assembly and an LCD panel. Double-coated rim tape is placed over the stacked films, which seals the edges of the films. A cover sheet is then placed over the rim tape. To finish the display, the cover sheet is removed, and the LCD panel is adhered to the rim tape. The resultant stack of separate optical films is bulky.

This process is difficult and costly in terms of time and material. Creating tabs on the films increases the amount of waste material that is produced and increases the width of the bezel, or edge, that must extend around the perimeter of the display to cover the tab. Because the tabs extend to the edge of the rim tape, a path is created that allows debris to enter and settle between the films. Removing cover sheets from individual films increases assembly time and the possibility of damaging the films. In addition, as optical films are made in ever thinner variants, it becomes increasingly difficult to handle an individual optical film, by hand or machine. Thus, resolving these problems would increase product output by increasing assembly efficiency and reducing the number of damaged films.

U.S. Pat. No. 7,339,635 (Freking et al.) discloses an illustrative approach whereby optical films are stacked and arranged in sub-assemblies to reduce the handling of individual layers in subsequent device manufacturing operations.

In many applications, it would be advantageous for manufacturing, handling, and cost reasons if two or more optical films could be joined to form one unitary film. However, the act of joining two or more optical films into one unitary film assembly in a manner that eliminates the air/polymer interfaces that are important to the performance of many optical films results in an "optical coupling" of the films that detracts from the desired optical performance of the final product in which the films are components. Many optical films and assemblies rely in part upon passage of light through one or more air/polymer interfaces to achieve desired optical effect(s).

The need exists for alternative constructions of unitary (i.e., "mechanically coupled") optical film stacks wherein two or more optical films are arranged in an effective configuration to impart desired combined performance while substantially maintaining desired air/polymer interfaces (i.e., minimizing "optical coupling").

The need exists for alternative constructions of unitary optical film stacks comprising light redirecting film and light diffusion film.

SUMMARY

This invention provides novel constructions of unitary optical film stacks comprising light redirecting film and light diffusion film which are physically coupled in mechanically robust configuration while minimizing the degree to which they are optically coupled.

Ideally, optical films are stacked in such a manner that a gap (typically merely air space referred to as an "air gap") is maintained between adjacent films to optimize optical performance. A typical optical film material has a refractive index of about 1.5. When there is an air gap in between adjacent optical films, light traveling at angles larger than total internal reflection angles (TIR angles) is trapped within each optical film. Such configurations are sometimes described as being "optically decoupled" and desired optical performance is obtained. When the gap between two optical films is filled by a third optical material, for example an optical clear adhesive, the desired total internal reflection interfaces of the optical films are compromised, light at high angles will travel from one optical film to the other, thereby degrading resultant optical performance. The two optical films in such a situation are sometimes referred to as being "optically coupled".

In brief summary, an optical film stack of the invention comprises (a) a light redirecting film assembly; (b) a light diffusion film assembly; and (c) an optical adhesive. The light redirecting film assembly comprises a light redirecting film and has a first structured major surface and an opposing second major surface. The light diffusion film assembly has a first major surface and an opposing second major surface. The second major surface of the light redirecting film assembly has an array of protrusions and land portions surrounding the protrusions. The second major surface of the light redirecting film assembly is oriented toward the first major surface of the light diffusion film assembly. The optical adhesive is in a layer on the first major surface of the light diffusion film assembly. The protrusions on the second major surface of the light redirecting film assembly extend into and adhere to the optical adhesive layer such that the light redirecting film assembly and the light diffusion film assembly are physically coupled non-continuously.

The present invention provides novel constructions or film assemblies with several surprising advantages. With the invention, numerous forms of optical stacks and devices comprising optical film stacks can be fabricated more efficiently, and if desired, using ever thinner constituent optical films. Resultant optical stacks can offer heretofore unattained combinations of performance such as high optical gain coupled with robust mechanical durability.

BRIEF DESCRIPTION OF DRAWING

The invention is further explained with reference to the drawing wherein.

These figures are not to scale and are intended to be merely illustrative and not limiting. To facilitate understanding of this description, orientation of each Fig. in a common x-y-z orientation system is shown.

DETAILED DESCRIPTION OF ILLUSTRATIVE EMBODIMENTS

Figure 1:
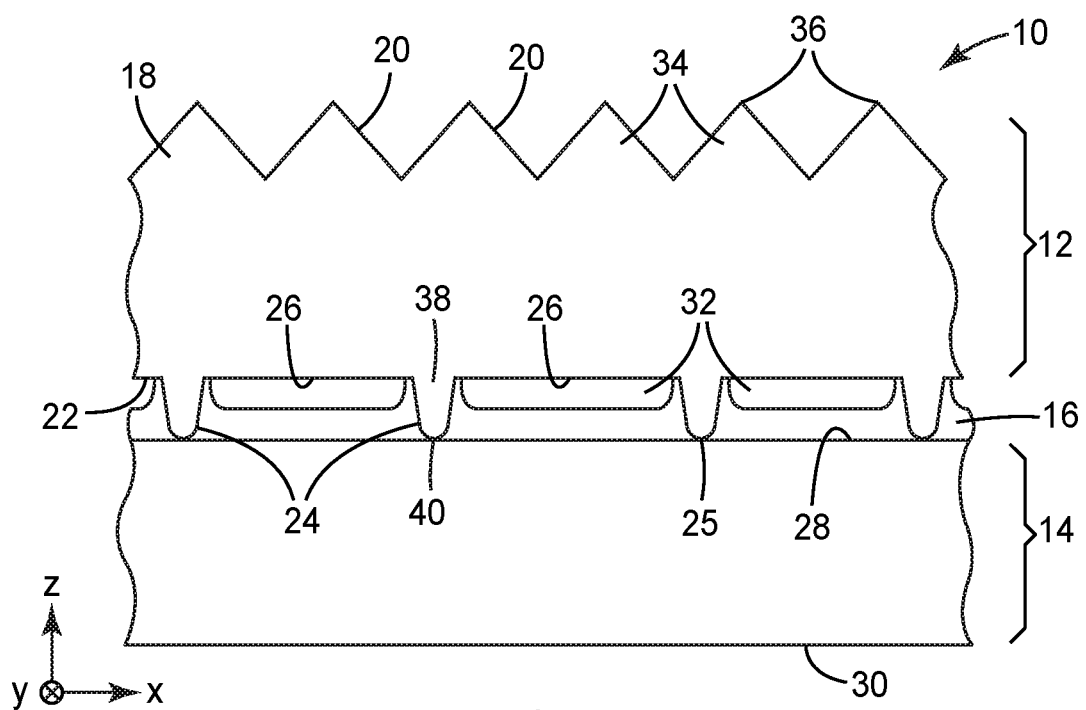
FIG. 1 is a schematic cross sectional view of a portion of an illustrative optical film stack of the invention.
Figure 2:
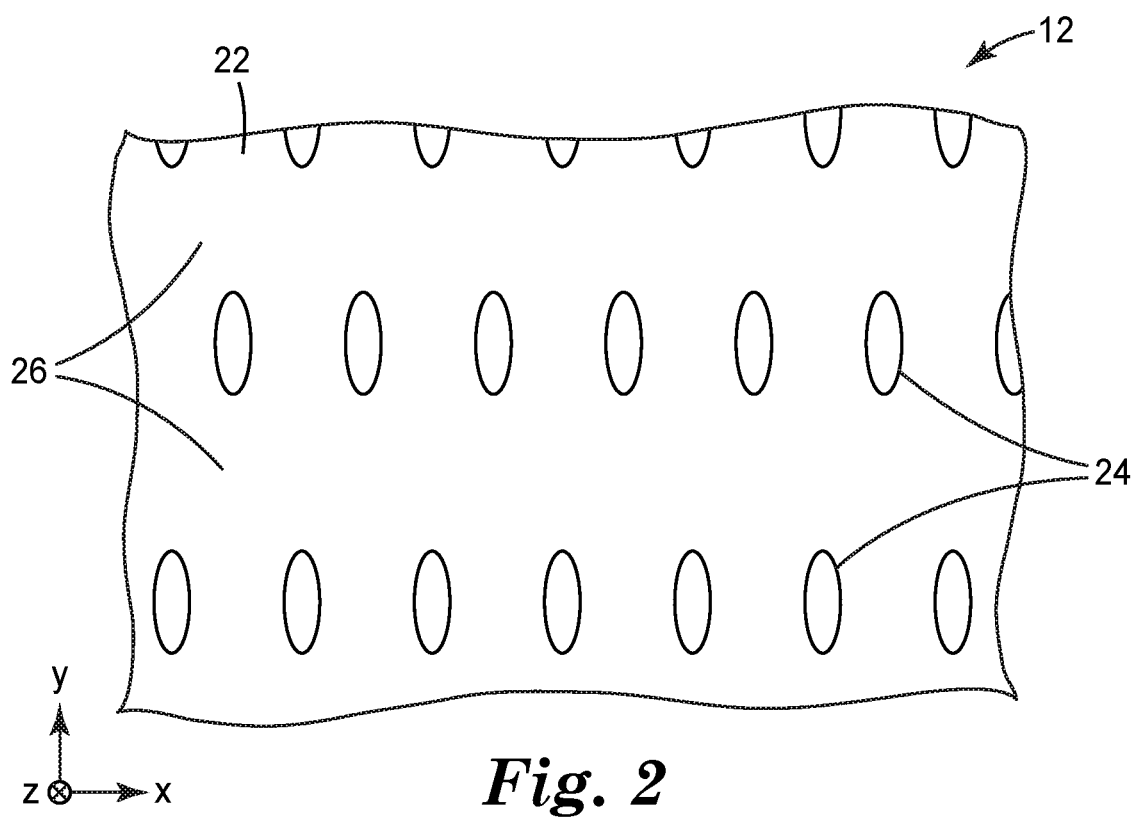
FIG. 2 is a schematic plan view of the second major surface of the light redirecting film assembly of FIG. 1.

FIG. 1 shows an illustrative optical film stack of the invention. Optical film stack 10 comprises light redirecting film assembly 12, light diffusion film assembly 14, and optical adhesive 16. Light redirecting film assembly 12 and light diffusion film assembly 14 are physically coupled, and collectively are unitary optical film stack 10.

Light redirecting film assembly 12 comprises light redirecting film 18 and has first structured major surface 20 and opposing second major surface 22. Second major surface 22 has an array of protrusions 24 and land portions 26 surrounding protrusions 24. Light diffusion film assembly 14 has first major surface 28 and opposing second major surface 30.

Second major surface 22 of light redirecting film assembly 12 is oriented toward first major surface 28 of light diffusion film assembly 14. Optical adhesive 16 is in a layer on first major surface 28. Protrusions 24 of light redirecting film assembly 12 extend into and adhere to the optical adhesive layer such that light redirecting film assembly 12 and light diffusion film assembly 14 are physically coupled into unitary optical film stack 10.

As shown in FIG. 1, light redirecting film assembly 12 and light diffusion film assembly 14 are coupled via protrusions 24 adhered to optical adhesive 16 with, corresponding to land portions 26, openings 32 in which an air interface is maintained to minimize the degree of optical coupling between physically coupled light redirecting film assembly 12 and light diffusion film assembly 14 in accordance with the invention.

The functionality of the resultant optical film stack is determined in large part by the selection of constituent light redirecting film assembly 12, light diffusion film assembly 14, and optical adhesive 16.

Light Redirecting Film Assembly

Light redirecting films used in optical stacks of the invention typically have a plurality of microstructures to impart desired light management properties to the optical film stack. In many typical embodiments, the microstructures are an array of linear microprisms (e.g., such films often being referred to as "prismatic film") or other lenticular features. The microstructures are of selected geometry to impart desired light management properties to the optical film stack. Those skilled in the art will be able to readily select suitable light redirecting films, with appropriate configurations, to provide desired optical performance.

The structured features may be any total-internal-reflection ("TIR") promoting replicated surface structures including prisms and/or lenticulars. As will be understood, the surface structures can be continuous or piecewise continuous. As will be understood, the dimensions of the features may be uniform or irregular (e.g., have chaos variation). Though typically primarily linear structures are used, in-plane serpentine variations and/or variations in height along the peaks or from peak to peak of the linear structures may be imposed.

The light redirecting film assembly comprises, and in some embodiments may consist essentially of, a light redirecting film. The light redirecting film assembly has a first major structure surface and an opposing second major structured surface. In the embodiment shown in FIG. 1, light redirecting film assembly 12 consists of light redirecting film 18. First major surface 20 of assembly 12 is made up of a plurality of microstructures 34 (e.g., linear prisms with peaks 36). Second major surface 22 of assembly 12 has protrusions 24.

Figure 3:
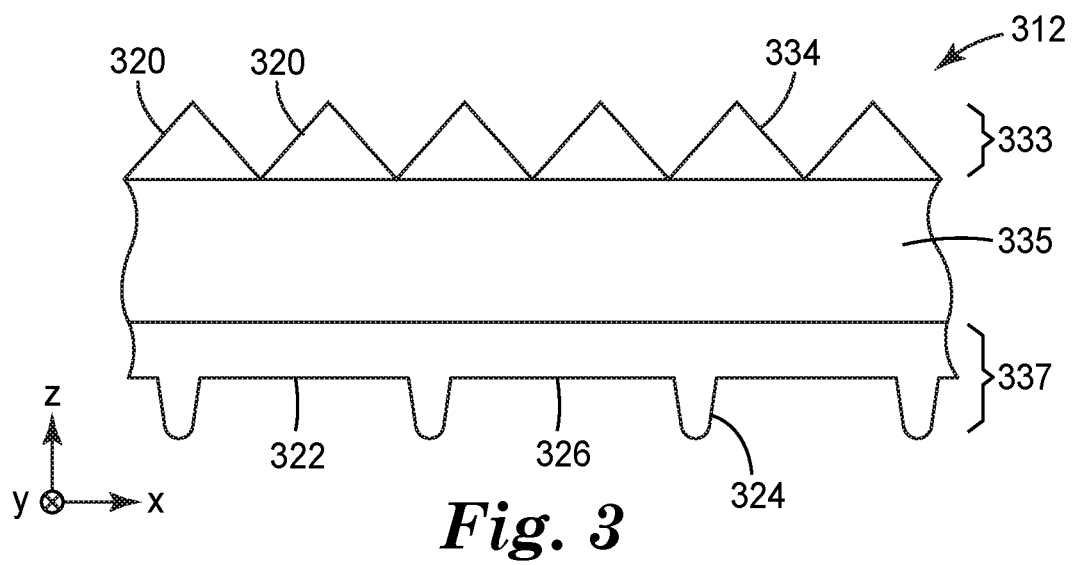
FIG. 3 is a schematic cross sectional view of a portion of the light redirecting film assembly of an illustrative embodiment an optical film stack of the invention.

The light redirecting film assembly may be of monolayer or multilayer construction. An illustrative multilayer embodiment is shown in FIG. 3, wherein light redirecting film assembly 312 has first major surface 320 and opposing second major surface 322. Assembly 312 comprises optic structured layer 333 with optically effective microstructures 334, body layer 335, and coupling protrusion layer 337 with protrusions 324. An advantage of multilayer embodiments is that the different layers may be separately optimized. For instance, in many applications it is preferred to use relatively high refractive index materials (e.g., in range of about 1.64 to about 1.7), sometimes referred to as "high gain" resins, in the optic structured layer to achieve higher optical performance while polymeric materials of more conventional index of refraction (e.g., from about 1.48 to about 1.51) are well suited for use in the coupling protrusion layer.

The light redirecting film assembly, is manufactured from suitable optically effective materials. Typically, polymeric materials such as acrylic, polycarbonate, UV-cured acrylate, or the like, are used. In the case of multilayer assemblies, the constituent layers are made of such materials, with different constituent layers in an assembly being made with the same or different materials. For example, in illustrative embodiments of the multilayer embodiment as shown in FIG. 3, structured layer 333 may be made of cast and cured materials (e.g., ultraviolet-cured acrylics) cast on polyester body layer 335 (e.g., polyester terephthalate ("PET")) as a substrate. Biaxially oriented PET is often preferred for its mechanical and optical properties.

Illustrative examples of light redirecting films which may be used in light redirecting film assemblies of optical stacks of the invention are disclosed in U.S. Pat. No. 9,116,285 (Edmonds et al.). Other alternatives will be readily apparent to those skilled in the art.

Physical coupling of the light redirecting film assembly to the light diffusion assembly to form the unitary optical stack of the invention is embodied in the protrusions projecting from the second major surface of the light redirecting assembly which penetrate into, and are bonded to, the adhesive on the first major surface of the light diffusion film.

With reference to FIG. 1, protrusions 24 project from second major surface 22 of light redirecting assembly 12. Protrusions 24 penetrate into, and are bonded to, adhesive 16 on first major surface 28 of the light diffusion film 14. In some embodiments, protrusions 24 may penetrate substantially completely through adhesive 16 and be in contact with first major surface 28 of light diffusion film assembly 14. In some embodiments, the protrusions may penetrate only partially through the adhesive.

In many embodiments, the protrusions are taller than the adhesive layer is thick. This facilitates manipulation of the component light redirecting film assembly and light diffusion assembly into desired position relative to one another including maintaining the air gaps critical to desired optical performance of the resultant optical film stack.

In many embodiments, the protrusions will be from about 4 to about 15 microns, typically preferably from about 8 to about 10 microns, tall. If the protrusions are too short, it may be more difficult to obtain the desired air gaps at the land portions of the second major surface of the light redirecting film assembly and the mechanical stability of the resultant optical film stack may be diminished. If the protrusions are too tall, the overall thickness of the resultant unitary optical film stack will tend to be greater. In some illustrative embodiments, the protrusions will be from about 8 to about 10 microns tall and the adhesive layer will be from about 5 to about 6 microns thick. If the adhesive layer is too thin, the mechanical stability of the resultant optical film stack will tend to be diminished. If the adhesive layer is too thick, the overall thickness of the resultant unitary optical film stack will tend to be greater, and particularly if the protrusions are too short, it may be more difficult to obtain the desired air gaps at the land portions of the second major surface of the light redirecting film assembly.

The protrusions in an optical film stack of the invention will typically be of substantially uniform size and shape. If desired, however, they may be made with variations in size, shape, or both if desired. The protrusions may be of any desired shape. They are preferably tapered from base or root 38 (where they project from the light redirecting film assembly) to the tip 40, as are protrusions 24 in FIG. 1. The tip (i.e., end of the protrusion opposite to the base) is typically preferably somewhat rounded (e.g., as are protrusions 24 in FIG. 1) to facilitate penetration into the adhesive layer, but may be flat (e.g., as are protrusions 524 in FIG. 5).

The dimensions of the base of the protrusions may be of desired aspect ratio (i.e., relative dimensions in the x-y plane). Protrusions which are relatively smaller in base dimensions will tend to result in optical film stacks which exhibit relatively less optical coupling between the light redirecting film assembly and the light diffusion assembly but will also tend to exhibit relatively weaker physical integrity. Conversely, protrusions which are relatively larger in base dimensions will tend to result in optical film stacks which exhibit relatively more optical coupling between the light redirecting film assembly and the light diffusion assembly but will also tend to exhibit relatively stronger physical integrity. In many embodiments, protrusions which are substantially V-shaped, with sides oriented at about 30° included angle and a tip which is curved to a radius of about 2 to about 3 microns are well suited for many applications with an effective combination of good physical coupling strength (and attendant robust physical characteristics of the optical film stack) and an acceptable level of optical coupling. Those skilled in the art will be able to optimize these parameters for particular applications in accordance with the invention.

In some embodiments, the protrusions have a longest base dimension of from about 4 to about 70 microns. Typically the longest base dimension is at least about 10 microns, typically preferably from about 40 to about 60 microns. In some embodiments, the protrusions have a shortest base dimension of from about 4 to about 12 microns. In some embodiments, the protrusions have a longest base dimension of from about 40 to about 60 microns and a shortest base dimension of from about 4 to about 12 microns. In some embodiments, the protrusions have a longest base dimension of from about 40 to about 60 microns, a shortest base dimension of from about 4 to about 12 microns, and a height of from about 4 to about 15 microns.

In some embodiments, the bases of the protrusions will constitute from about 10 to about 15% of the area of the second major surface of the light redirecting film assembly with remaining portion largely being land portions surrounding the protrusions. Embodiments with proportions outside this range may be made in accordance with the invention. As will be understood, embodiments in which the area proportion of protrusions is relatively lower will tend to exhibit relatively less optical coupling but will also tend to exhibit relatively weaker bonds, and therefore weaker physical integrity. Conversely, embodiments in which the area proportion is relatively higher will tend to exhibit relatively stronger bonds, and therefore greater physical integrity, but will also tend to exhibit relatively more optical coupling.

The protrusions may be arranged in a uniform array (e.g., with uniform periodicity in x and y dimensions), or in a randomized array as desired. For instance, in the embodiment shown in FIG. 5, protrusions 524 are of uniform shape and size, but arranged in a random manner on second major surface 522 of light redirecting film assembly 512; whereas, in the embodiment shown in FIG. 6, protrusions 624 are of uniform shape and size, and arranged in a uniform manner on second major surface 622 of light redirecting film assembly 612.

Figure 5:
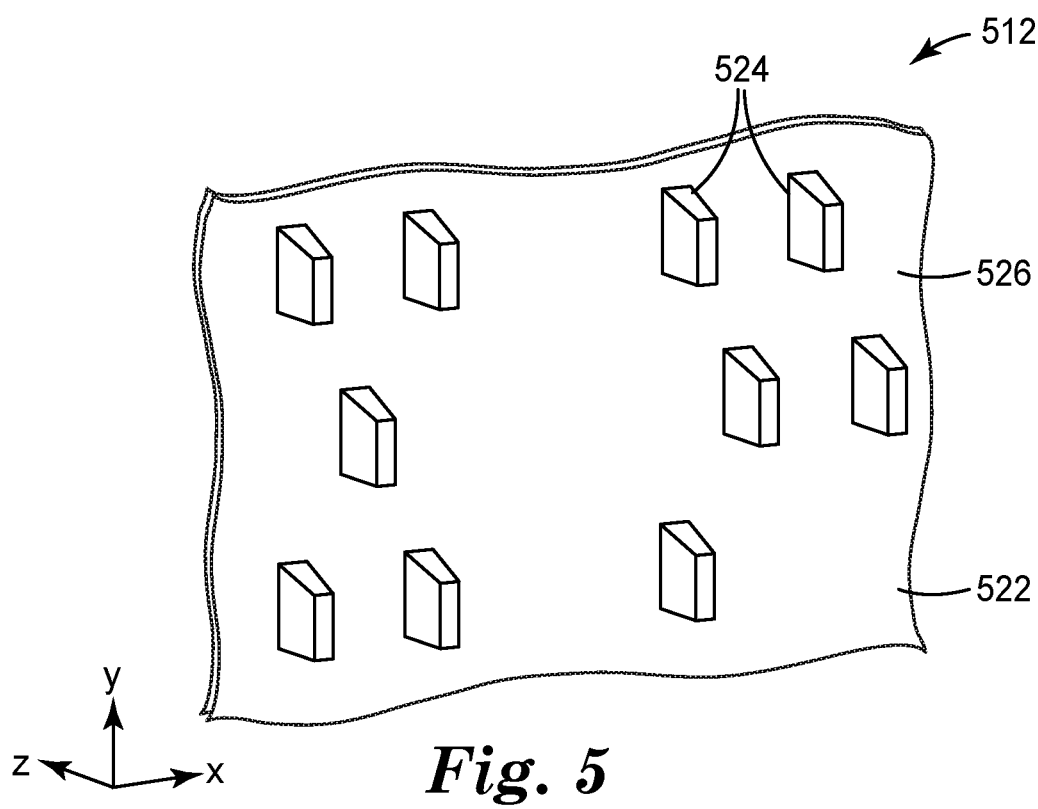
FIGS. 5 and 6 are schematic perspective views of a portion of the second major surface of the light redirecting film assembly of illustrative embodiments of optical film stack of the invention.
Figure 6:
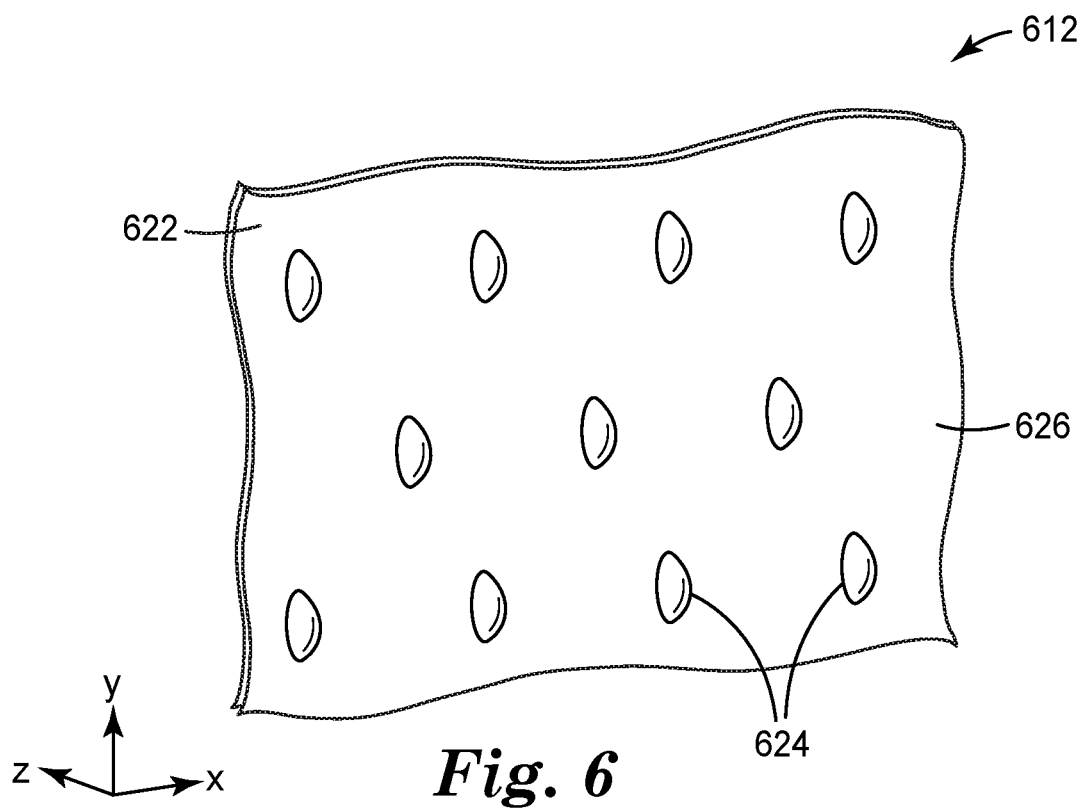

The protrusions may be of any desired shape, for instance with a plurality of flat facets as protrusions 524 in FIG. 5 possess, or a single or plurality of rounded surfaces as the protrusions in FIG. 6 have. It has been observed that protrusions having rounder surfaces tend to yield optical film stacks exhibiting greater physical integrity as a result of greater surface area and stronger bonds than do protrusions with flat surfaces. Protrusions having relatively smaller tips tend to yield optical film stacks exhibiting lower levels of optical coupling than do protrusions having broader tips.

Illustrative examples of shapes suitable for the protrusions include square, round, and oval pins, dune-like, linear, and intersecting shaped structures, etc. The cross sectional dimensions of the protrusions along the x and y axes may be relatively symmetrical or asymmetrical as desired. Typically is preferred that the protrusions have a cross sectional profile that is longer in one x or y dimension than at the other x or y dimension as such relatively elongate profiles tend to impart greater physical coupling integrity to the resultant optical film stack while minimizing the degree of optical coupling.

Figure 7:
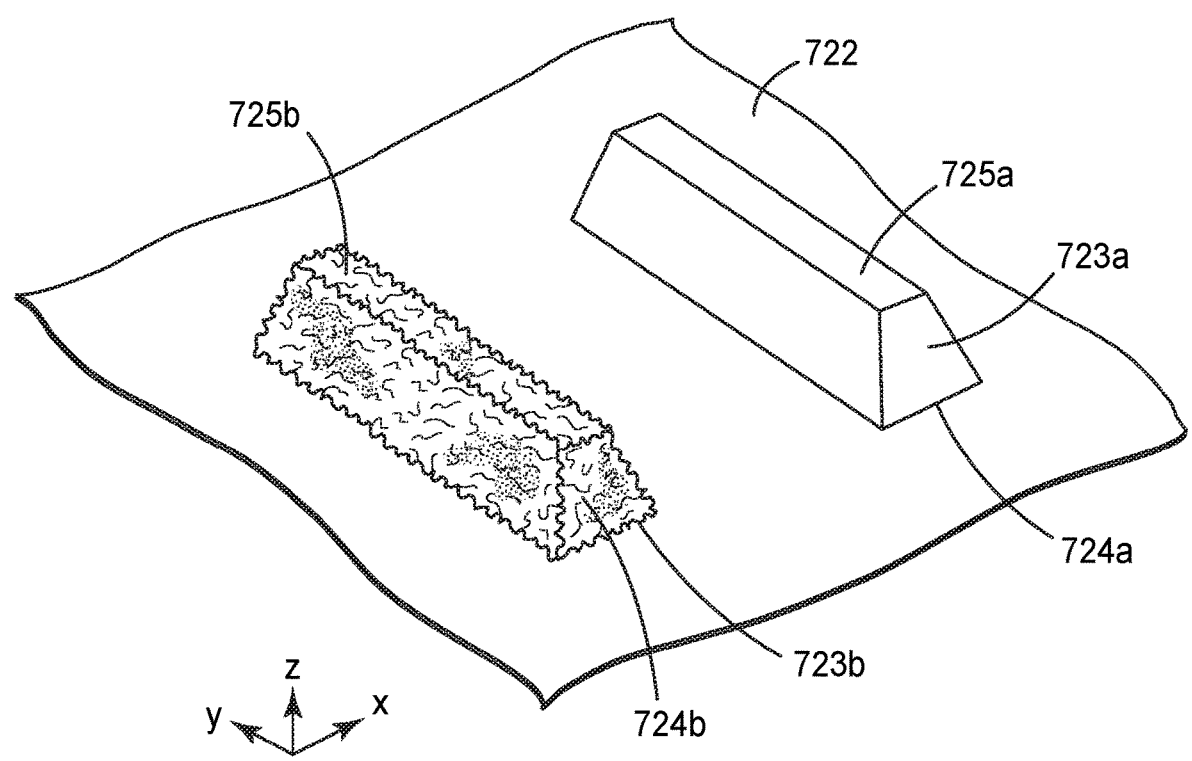
FIG. 7 is a schematic perspective view of two illustrative protrusions on the light redirecting film assembly of illustrative embodiments of optical film stack of the invention.

In some embodiments, the surface of the protrusions may be microstructured or roughened to increase the strength of the bond to the adhesive which is provided. For instance, as shown FIG. 7, protrusion 724a has flat side facets 723a and tip facet 725a while protrusion 724b has microstructured side facets 723*b* and tip facet 725*b*. Using protrusions of similar size, otherwise similar shape, and arrangement on the respective light redirecting film assemblies, in otherwise similar optical film stacks, an optical film stack comprising protrusions 724*b* would tend to exhibit greater physical integrity and lower optical coupling than would an optical film stack comprising smooth surfaced protrusions 724*a*. The facets of the protrusions may be flat, planar faces or curved. To facilitate fabrication and release from mold or embossing surfaces, it is typically preferred that the protrusions be tapered (i.e., with larger cross sectional dimension at the base that the tip), generally convex shapes, and have rounded tips.

As shown in FIG. 1, the light redirecting film assembly may be of unitary construction, having a first structured major surface optically effective microstructures thereon and an opposing second major surface from which the protrusions project. In other embodiments, the assembly is made up of two or more component layers. For instance, FIG. 3 shows an embodiment wherein the assembly is made up of three component layers which may be laminated or self-adhered to one another, or which are attached using optical adhesive (not shown).

The protrusions may be formed by many techniques, for instance, such as are used to form the optically effective microstructures. The protrusions can be fabricated by many techniques, illustrative examples including cast and cure, embossing, screen printing, deposition, flexo-printing, 3D printing or additive processing, etc., that yield a member having optically effective smooth land portions and the desired coupling structures. The protrusions do not need the fidelity of replication required of optically effective microstructures on the first major surface of the assembly.

Light Diffusion Film Assembly

Figure 4:
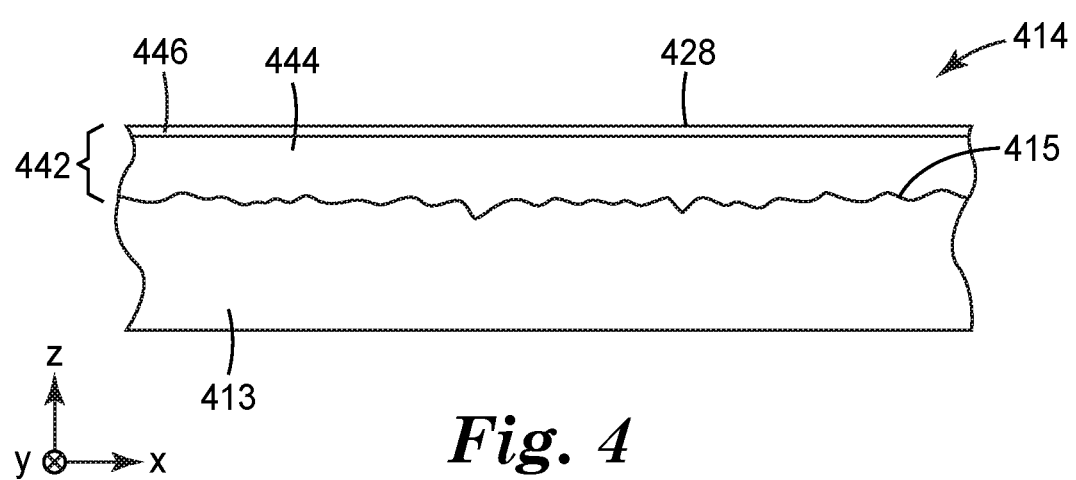
FIG. 4 is a schematic cross sectional view of a portion of the light diffusion film assembly of an illustrative embodiment an optical film stack of the invention.

The light diffusion film assembly comprises light diffusion film. As shown in FIG. 4, in a typical embodiment, light diffusion film assembly 414 comprises light diffusion film 413 having diffusing surface 415.

In some instances, the diffusing film is of beaded construction. For example, the assembly may comprise a film having a layer of microscopic beads adhered to one surface of the film, and the refraction of light at the bead surfaces may operate to provide the light diffusion characteristics of the film.

Other diffusing films use a structured surface other than a beaded layer to provide the light diffusion, where the structured surface is made by microreplication from a structured tool. Examples of such diffusing films include: films (referred to herein as "Type I Microreplicated" diffusing films) with rounded or curved structures microreplicated from a tool having corresponding structures made by removing material from the tool with a cutter, as described in US Patent Appln. Publn. No. 2012/0113622 (Aronson et al.), US Patent Appln. Publn. No. 2012/0147593 (Yapel et al.), WO 2011/056475 (Barbie), and WO 2012/141261 (Aronson et al.); and films (referred to herein at "Type II Microreplicated" diffusing films) with flat-faceted structures microreplicated from a tool having corresponding structures made by an electroplating process, as described in US Patent Appln. Publn. No. 2010/0302479 (Aronson et al.). US Patent Appln. Publn. No. 2015/0293272 (Pham et al.) discloses optical diffusing films made by microreplication which can be used in light diffusion films of optical film stacks of the invention.

Still other microreplicated diffusing films include films in which a tool surface is made to be structured by a sandblasting procedure, and the structured surface is then imparted to the film by microreplication from the tool. See, for example, U.S. Pat. No. 7,480,097 (Nagahama et al.).

In instances where the light diffusion film utilizes a surface refractive effect to achieve diffusion (e.g., such as structured surface type, and many beaded type diffusion films), in order to maintain the desired refractive index contrast, a material with low index of refraction is coated over the light diffusing surface feature. The index of refraction of many optical adhesive materials is relatively close to the index of refraction of many surface refractive diffusing films, thus application of adhesive directly to the surface would greatly diminish or eliminate desired refractive index contrast (and thus diminish or eliminate desired diffusion). By providing a material with relatively low index of refraction as compared to overlying adhesive between the adhesive and light diffusing surface feature, desired refraction-caused diffusion by light diffusion film 413 is achieved. Such an embodiment is shown in FIG. 4, wherein low index layer 444 is provided on the surface refraction functional diffusion surface 415.

Many known low index layer materials utilize a combination of polymeric materials and additives in a porous structure to provide the desired relatively low index of refraction. In such instances, and also in the case of non-porous low index materials which may be subject to degradation or undesired compatibility with the adhesive (not shown in FIG. 4 but shown in FIG. 1), refraction preservation layer 442 further comprises a skin layer or seal layer 446 over the surface of low index layer 444 opposite diffusion surface 415. In such embodiments, seal layer 446 constitutes first major surface 428 of light diffusion film assembly 414. Absent such seal layer, the adhesive composition may penetrate into a porous low index layer, or degrade an incompatible low index layer, so as to degrade desired performance of the light diffusion assembly.

In addition to preserving desired refractive performance of the light diffusion film assembly, such layers can be used to achieve a more planar first major surface 428, thereby facilitating effective adhesion of the optical adhesive to the first major surface of the light diffusion film assembly.

Suitable materials for refractive preservation layer 442 may be readily selected. Illustrative examples of materials suitable for use as low index layer 444 in optical film stacks of the invention include low index optical films such as are disclosed in US Patent Appln. Publn. Nos. 2012/0038990 (Ho et al.), 2012/0287677 (Wheatley et al.), and 2016/0368019 (Wolk et al.). US Patent Appln. Publn. No. 2015/0140316 (Steiner et al.) discloses a method for forming a low index material with protective coating which may be used in the present invention to form, with reference to FIG. 4, a refraction preservation layer 442 comprising low index layer 444 with seal layer 446 (corresponding to, respectively, the "first layer" and "protective layer" of Steiner et al.).

Adhesive

Those skilled in the art will be able select suitable optical adhesives for use as the present invention. The adhesive preferably exhibits relatively low modulus and high flow properties during a "working phase" such that when contacted to the protrusions the adhesive will tend to wick up along at least a portion of, and encapsulate the surface of the protrusions without substantially wetting out the land portions of the coupling member between the protrusions. This leaves the desired air gap interface. The adhesive may extend along only a portion of the protrusions or may extend completely over the protrusion and contact portions of the land adjacent the base of the protrusions, thereby forming relatively stronger bond. However, to the extent that the adhesive completely surrounds the protrusions and contacts surrounding land portions, the degree of optical coupling between the light redirecting film assembly and light diffusion assembly tends to increase, thereby tending to reduce desired potential optical performance of the resultant optical film stack.

In many embodiments, the combined cross sectional area of the protrusions and encapsulating adhesive, if any, will constitute from about 8 to about 25 percent, typically preferably about 10 to about 15 percent, of the total areal cross section (i.e., in x-y plane) of the optical film stack at the second major surface of the light redirecting film assembly, leaving a remaining about 92 to about 75 percent, typically about 90 to about 85 percent, of the total area as exposed land portions at which air gaps are provided in accordance with the invention. As will be understood, at relatively lower proportions, physical coupling of the assemblies within the optical film stack is reduced, making the resultant stack more susceptible to fragmentation and failure, while at relatively higher proportions, although the physical coupling is stronger, optical coupling also tends to be higher.

After the adhesive achieves the desired flow and engagement with the protrusions, it is cured (e.g., by irradiation, etc.) to achieve a final secure bond and physical coupling of the light redirecting film assembly and light diffusion film assembly within the optical film stack. Typically, after curing the adhesive achieves a high cross-linking density so as to function effectively as a structural adhesive, providing a strong bond.

The invention thus provides a way to mechanically couple optical assemblies while minimizing resultant optical coupling. As a result, the invention enables the fabrication of component optical assemblies that offer many surprising advantages regarding easier handling, more physical robustness, reduced complexity and cost of devices in which they are incorporated, and high optical performance.

REFERENCE KEY

Reference numbers in the drawing refer to features as follows:

| Reference Number | Feature |
|---|---|
| 10 | Unitary optical film stack |
| 12 | Light redirecting film assembly |
| 14 | Light diffusion film assembly |
| 16 | Optical adhesive |
| 18 | Light redirecting film |
| 20 | First major surface of light redirecting film assembly |
| 22 | Second major surface of light redirecting film assembly |
| 24 | Protrusions |
| 25 | Protrusion tip |
| 26 | Land |
| 28 | First major surface of light diffusion film assembly |
| 30 | Second major surface of light diffusion film assembly |
| 32 | Air gaps |
| 34 | Microstructures. |
| 36 | Peaks |
| 38 | Protrusion base |
| 40 | Protrusion tip |
| 312 | Light redirecting film assembly |
| 320 | First major surface of light redirecting film assembly |
| 322 | Second major surface of light redirecting film assembly |
| 324 | Protrusions |
| 326 | Land |
| 333 | Microstructures |
| 334 | Microstructures |
| 335 | Body layer |
| 337 | Coupling protrusion layer |
| 413 | Light diffusion film |
| 414 | Light diffusion film assembly |
| 415 | Diffusing surface |
| 428 | First major surface of light diffusion film assembly |
| 442 | Refraction preservation layer |
| 444 | Low index layer |
| 446 | Seal layer |
| 512 | Light redirecting film assembly |
| 522 | Second major surface of light redirecting film assembly |
| 524 | Protrusions |
| 526 | Land |
| 612 | Light redirecting film assembly |
| 622 | Second major surface of light redirecting film assembly |
| 624 | Protrusions |
| 626 | Land |
| 722 | Second major surface of light redirecting film assembly |
| 723a | Side facet |
| 724a | Protrusion |
| 725a | Tip facet |
| 723b | Side facet |
| 724b | Protrusion |
| 725b | Tip facet |

Example

Materials for Formation of Beaded Diffusion Film ("BDF")

| Component | Description | Charge (lbs) | % wt on dry solid |
|---|---|---|---|
| SR9035 | ethoxylated, trimethylolpropane triacrylate, from Sartomer | 1.6 | 11.87 |
| CAB-381-20 | cellulose acetate butyrate, from Eastman Kodak | 0.61 | 4.51 |
| ESACURE ™ One | difunctional alpha-hydroxy ketone, from Evonik Industries | 0.1 | 0.76 |
| TEGO ® 2250 | polyether-modified polysiloxane, from Evonik Industries | 0.01 | 0.05 |
| Dowanol ® PM | propylene glycol methylether, from Dow | 13.57 | 0.0 |
| MX 500 | MX 500: 5 micron PMMA forming bodies, from Soken Chemical and Engineering Co. | 8.78 | 65 |
| A-174 treated silica (45% wt in Dowanol) | A-174 treated silica prepared as described in US Patent Appln. Publn. No. 2013/0302594 A1, page 7 section 0058. | 5.35 | 17.81 |
| Total | | | 100% |

Preparation of BDF on PET Film The composition described above was applied on a primed sized 3 mil polyethylene terephthalate film via slide coating (as generally described in U.S. Pat. Nos. 6,214,111 and 6,576,296 except using select materials as described herein), heated and dried at 70° C., for 1.5 minutes, and then exposed to UV light for 1 to 2 seconds to yield the light diffusion film.

Application of Refraction Preservation Layer on BDF

A low index layer and seal layer which collectively constitute a refraction preservation layer were coated simultaneously onto the surface of the BDF using a multi-layer slide coating die. The bottom, or first layer (which formed the low index layer), was a 9% solids by weight (2% PVA solution) low index coating solution prepared by mixing 1.25 wt % Poval PVA 235, 37.5 wt. % Cab-O-Sperse™ PG-022, 0.07 wt % citric acid. 0.18 wt % boric acid, 0.025 wt Tergitol Minfoam, 16 wt % isopropyl alcohol, and 44.975 wt % water. The second layer (which formed the seal layer) was a 4.2% solids by weight (4.2% PVA solution) protective layer prepared by mixing 4.14 wt % Poval PVA 235, 0.04 wt citric acid, 0.025 wt % BYK 345, 25 wt % isopropyl alcohol, and 70.795 wt % water. The second layer was prepared so that it freely wet out the first layer on the slide coater. A slide coater was positioned at a gap of 0.008 inches from the BGD coating web moving at 100 ft/min (30.48 m/min). The first layer was pumped at 400 g/min to a slide coater having a first slot thickness of 0.008 inches (0.203 mm), a step height of 0.010 inches (0.254 mm) and a 13 in (33 cm) width, and the second layer was pumped at 180 g/min to the slide coater having a second slot thickness of 0.029 inches (0.737 mm), a step height of 0.020 inches (0.508 mm) and a 13 in (33 cm) width. The coated layers were then dried in a two zone oven. The first zone was 70 ft (21.3 meters) long and held at 75° C., and the second zone was also 70 ft (21.3 meters) long and held at 90° C., yielding a light diffusion film assembly with refraction preservation layer. The refractive index of low index layer was measured as 1.18, and the sealing layer was about 0.75 micron in thickness.

Preparation of Adhesive Coating Formulation

| Materials | Description | Supplier |
| --- | --- | --- |
| CN3100 | Low viscosity Oligomer | Sartomer, Exton, PA |
| CN983 | Urethane Acrylate | Sartomer, Exton, PA |
| EBECRYL ® 230 | Aliphatic Urethane Diacrylate | Allnex, Alpharetta, GA |
| IRGACURE ® 184 | 1-Hydroxycyclohexyl phenyl ketone | BASF, Florham Park, NJ |
| Acrylate Copolymer | 3M internal, 60% solid in MEK, Mw = 398,000 | |

Preparation of Adhesive Coating Formulation

Stock Solution I was prepared as follows: In a 1 gallon jar, 463.2 g of CN983, 193 g of CN3100, 386 g of EBECRYL® 230, 463 g of methyl ethyl ketone, 579 g of 1-methoxy-2-propanol were added. The mixture was put on a roller mixer for 6 hours to form a homogenous stock solution at 50% wt.

Stock Solution II was prepared as follows: In a 1 gallon jar, 713 g of acrylate copolymer (60% wt solid in MEK) and 1524 g of MEK were added. The mixture was put on a roller for 6 hours to form a homogenous stock solution at 19.12% solid.

Adhesive coating composition prepared as follows: In a glass jar, 559.5 g of Stock Solution II, 165 g of Stock Solution I, 247.5 g of 1-methoxy-2-propanol and 3.06 g of IRGACURE® 184 were mixed together to form a clear adhesive coating formulation with final content of 20% solids.

Adhesive Coating Process

The adhesive coating formulation was coated by a syringe-pump at various flow rates into a 20.8 cm (8-inch) wide slot-type coating die. The slot coating die uniformly distributed a 20.8 cm wide coating onto the first major surface of the light diffusion film assembly at a film speed of about 5 ft/min (152 cm/min). The solvents were removed by transporting the assembly to a drying oven operating at 200° F. for 2 minutes at a web speed of 5 ft/min. After drying, a thin brightness enhancement film with coupling structures on the opposite face from the prisms was laminated onto the adhesive coating through an on-line laminator, where the coupling projections were inserted into the adhesive coating. Next, the laminated films was post-cured using a Fusion System Model I300P configured with an H-bulb (from Fusion UV Systems, Gaithersburg Md.), operated at full power. The UV Fusion chamber was supplied with a flow of nitrogen that resulted in an oxygen concentration of approximately 50 ppm in the chamber.

Coating thickness of the adhesive was controlled by adjusting the flow rate. Dry coating thickness for the three flow rates were 5.0 microns, 5.5 microns and 6.0 microns for flow rates of 5.7 cc/min, 6.29 cc/min and 6.86 cc/min, respectively.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Brightness Gain Measurement

Several illustrative optical film stacks were prepared, brightness gain was measured, and the results are presented in Table 1. Comparative Example C1 was illustrative of the traditional two-film approach, in which a Thin Brightness Enhancement Film, or "TBEF" (3M Company, St. Paul, Minn.) was simply positioned above a piece of the light diffusion film assembly prepared above with no adhesive whatsoever (i.e., they are mutually supported at their edges in a chassis or frame), leaving a natural air gap between the two optical films. Comparative Example C2 was illustrative of the use of an optically clear adhesive to bond the two optical film assemblies into a unitary stack with the adhesive forming a substantially continuous bond to each of the optical film assemblies.

As shown in the results, in Comparative Example C2 there was a significant decrease in brightness gain as compared to Example C1, resulting from elimination of the optically beneficial air interface. The results from Example 1 illustrate the unitary film stack of the invention using protrusion structures to main sufficient air-gaps between light redirecting film and light diffusion film assemblies. The brightness gain was measured 1.776, significant higher than the results obtained from Comparative Example C2.

| Example | Optical Film Stacks* | Brightness Gain (Avg.) |
| --- | --- | --- |
| C1 | Air gap by chassis support | 1.88 |
| C2 | Optical adhesive bond, no air gap | 1.59 |
| Example | Protrusions and adhesive | 1.776 |

Peel Strength of the Unitary Optical Stacks

Samples of the optical stack of Example 1 were cut to 1 inch strips. The 1 inch strip samples were laminated on the carrier tape with the backside of light diffusion film assembly facing the tape. Then, the light redirecting film assembly was then separated from the optical film stack at a peel rate of 12 inch/min. The peel force was measured in the range of 170 to 230 g/in.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An optical film stack comprising (a) a light redirecting film assembly comprising a light redirecting film and having a first structured major surface and an opposing second major surface; (b) a light diffusion film assembly having a first major surface and an opposing second major surface; and (c) an optical adhesive; wherein:
the second major surface of the light redirecting film assembly has an array of protrusions and land portions surrounding the protrusions;
the second major surface of the light redirecting film assembly is oriented toward the first major surface of the light diffusion film assembly;
the optical adhesive is in a layer on the first major surface of the light diffusion film assembly; and
the protrusions on the second major surface of the light redirecting film assembly extend into and adhere to the optical adhesive layer such that the light redirecting film assembly and the light diffusion film assembly are physically coupled non-continuously,
wherein at the second major surface of the light redirecting film assembly the aggregate proportion of the cross sectional area of the protrusions and adhesive contacting the land portions is from about 8 to about 25 percent of the total area.

2. The optical stack of claim 1 wherein the light redirecting film assembly is a monolayer structure.

3. The optical stack of claim 1 wherein the light redirecting film assembly is a multilayer structure.

4. The optical stack of claim 3 wherein the light redirecting film assembly comprises a polymeric film comprising an array of lenticular features having an index of refraction from about 1.64 to about 1.7 and the protrusions comprise polymeric material having an index of refraction from about 1.48 to about 1.51.

5. The optical stack of claim 1 wherein the protrusions have a height of from about 4 to about 15 microns.

6. The optical stack of claim 1 wherein the protrusions have a height of from about 8 to about 10 microns.

7. The optical stack of claim 1 wherein the protrusions have a longest base dimension of from about 4 to about 70 microns.

8. The optical stack of claim 1 wherein the protrusions have a longest base dimension of at least about 10 microns.

9. The optical stack of claim 1 wherein the protrusions have a longest base dimension of from about 40 to about 60 microns.

10. The optical stack of claim 1 wherein the protrusions have a shortest base dimension of from about 4 to about 12 microns.

11. The optical stack of claim 1 wherein the protrusions have a surface having curved portions.

12. The optical stack of claim 1 wherein the protrusions have a surface having one or more flat facets.

13. The optical stack of claim 1 wherein at least a portion of the surface of the protrusions is microstructured.

14. The optical stack of claim 1 wherein the protrusions are arranged in a uniform array.

15. The optical stack of claim 1 wherein the protrusions are arranged in a randomized array.

16. The optical stack of claim 1 wherein the light diffusion film comprises at least one of microscopic beads or microreplicated structured surface features.

17. The optical stack of claim 16 wherein the light diffusion film assembly comprises a low index coating encasing the surfaces of microscopic beads or microreplicated structured surface features.

18. The optical stack of claim 1 wherein the adhesive is from about 5 to about 6 microns thick.

19. The optical stack of claim 1 wherein the aggregate proportion of the cross sectional area of the protrusions and adhesive contacting the land portions is from about 10 to about 15 percent of the total area.

* * * * *